July 10, 1951     A. D. PENTZ     2,560,515

CENTRIFUGAL CLUTCH

Filed May 3, 1945

INVENTOR
Albert D. Pentz
BY
Alexander Chessen
his ATTORNEY

Patented July 10, 1951

2,560,515

UNITED STATES PATENT OFFICE 2,560,515

CENTRIFUGAL CLUTCH

Albert D. Pentz, Staten Island, N. Y.

Application May 3, 1945, Serial No. 591,811

3 Claims. (Cl. 192—105)

The invention is concerned with couplings between rotating elements of a mechanism made operative by centrifugal forces generated by their rotation and, more particularly, with couplings of this character in which the centrifugal forces act on a disc of a resilient material, such rubber, natural or synthetic.

In my copending application, Ser. No. 554,822, which resulted in the Patent No. 2,427,620, issued September 16, 1947, of which the present application is a continuation in part, is disclosed such a coupling as applied to a power transmission mechanism. On the driven shaft is fixed a pair of plates for rotation therewith, and a rubber disc intermediate said plates is caused to rotate as a unit with the driving shaft. This disc expands in response to centrifugal forces generated by the rotation of the driving shaft, but its expansion is peculiar inasmuch as it cannot expand circumferentially, being prevented from doing so, and the expansion is laterally effected, thereby bringing the disc into engagement with the pair of plates, thus transmitting the power from one shaft to the other.

The present application deals only with the coupling per se. It is similar to the coupling disclosed in the aforesaid copending application, except for an important improvement in the manner of connecting the rubber disc to the driving shaft. The connection, in the present case, is resiliently flexible, the rubber disc being allowed a slight movement as if it were held along its periphery by a multiplicity of universal joints of limited range. The purpose of this improvement is to allow the coupling to automatically adjust itself to any possible misalignment of the two shafts. Other purposes of the invention will readily become evident as the specification is unfolded.

Figure 1:
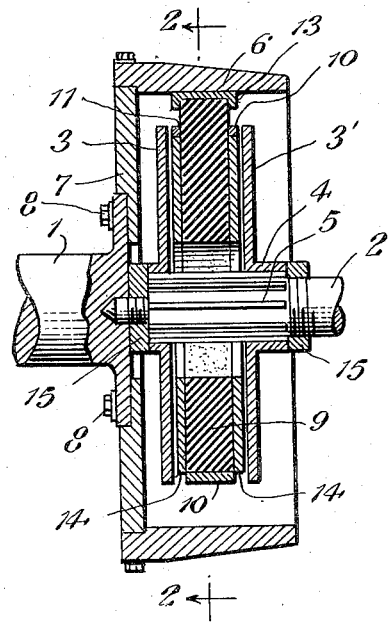
Figure 2:
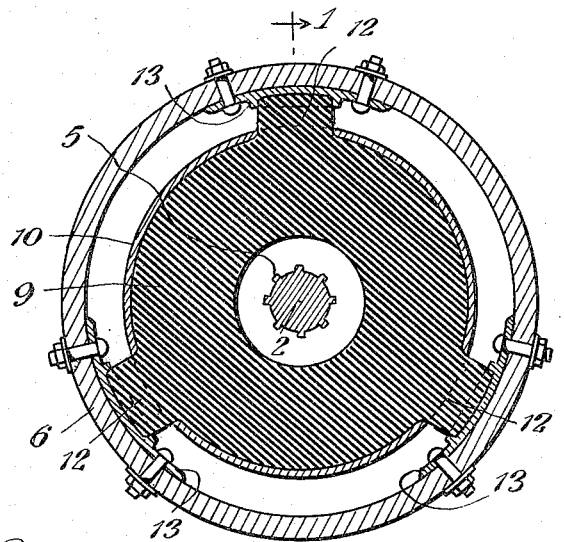
Figure 6:
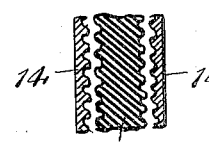
Figure 4:
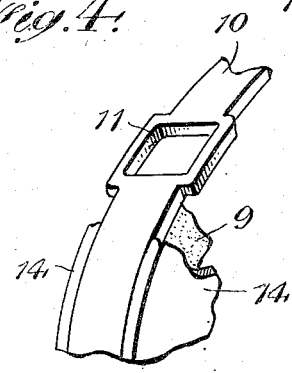
Figure 3:
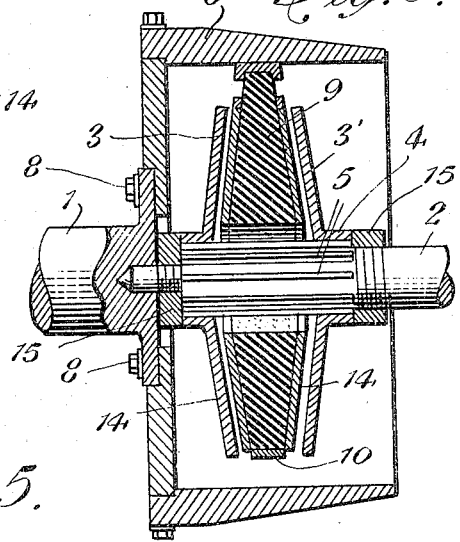
Figure 5:
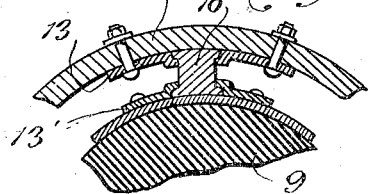

In the accompanying drawing, Figure 1 is an axial cross section of a coupling embodying the present invention. Figure 2 is a cross section taken along the line 2—2 of Figure 1. Figure 3 is an axial cross section similar to Figure 1 but for a modified form of the coupling. Figure 4 is a perspective view of the frame surrounding the rubber disc, shown only partly. Figure 5 is a detail illustrating another modification of the invention, also shown in part only. Figure 6 is a detail showing a modified arrangement of the friction plates used on the rubber disc.

Referring to the figures in detail, I is the driving shaft in a mechanism involving transmission from a driving shaft to a driven shaft, and 2 is the driven shaft. Fixed on the driven shaft 2 is a pair of plates 3 and 3' having a hub 4 which forms a sleeve splined along the ribs 5 unto the driven shaft 2. A drum 6 is secured to the wall 7 fixed to the driving shaft 1, as by means of bolts 8. Intermediate the pair of plates 3 and 3' is a disc 9 of rubber surrounded by a ring or frame 10, shown in detail in Figure 4. The disc 9 has extensions 12 passing out of the frame 10 through openings 11. The extensions 12 are received and held by brackets 13 secured to the drum 6. These brackets are provided with shoulders to hold the extensions 12 in place, as shown although not denoted by any numeral. Friction plates 14 on the rubber disc may be added, either in the smooth form shown in Figure 1, or corrugated as shown in Figure 6, the surface of the disc in the latter case being also corrugated to correspond to the corrugations of the friction plates 14. Displacement sidewise of the hub 4 is prevented by nuts 15.

The device in Figure 3 is similar to that illustrated in Figure 1 in every way, except that the plates 3 and 3' are cone shaped and the disc 9 is shaped to correspond to these plates.

In Figure 5 is shown a modification of the device in that the disc 9 has no extensions beyond the frame 10. In this modification, lugs 16 are provided between the drum 6 and the frame 10. These lugs are received and held by the brackets 13 on the drum 6 and the brackets 13' on the frame 10. There is no opening in the frame 10 in this modification and the brackets 13 and 13' are provided with shoulders to hold the lugs in place.

It will be seen from the above description that the coupling is similar to the one disclosed in the aforesaid copending application Ser. No. 554,822, which resulted in the Patent No. 2,427,620, issued September 16, 1947, except for the extensions 12 of the disc 9 or the lugs 16 between the drum and the frame 10. Of course, no frame 10 was needed in the coupling of the former device, because in that device the rubber disc is abutting the drum directly.

When the driving shaft rotates at a rate sufficiently high to cause the rubber disc to expand in response to centrifugal forces generated by the rotation of the shaft, the expansion of the rubber disc must proceed laterally, since the frame 10 prevents radial expansion, entirely, when the arrangement of Figure 5 is adopted, and with the exception of the few places providing the extensions 12 in the arrangement of Figures 1 and 2. These exceptions are of comparatively little effect on the general process of operation, since the extensions 12 themselves are prevented from expanding radially by the brackets 13. The lateral expansion of the disc 9 brings it into engagement with the plates 3 and 3', thereby effecting the transmission of power from the driving shaft to the driven shaft.

It should be noted that the lugs 16 need not be of the same kind of material as the disc 9. This is so only in the arrangement illustrated in Figures 1 and 2. The sole condition governing the structure of the lugs 16 is that they be resiliently flexible.

It also should be noted that the arrangement whereby the disc is connected to the driving shaft in the resiliently flexible manner illustrated is one that may be adopted for a great variety of couplings of quite different nature and type, the substance of the arrangement residing in the ability of the coupling to adjust itself to any possible misalignment of the two shafts or to temporary variations in this alignment, or to such other changes as may arise from wear and tear of the elements of the coupling itself.

The invention naturally is subject to many variations in structure and details and it is to be understood that such variations come within the purpose and spirit of the invention as here illustrated and claimed.

I claim:

1. A coupling between a driving shaft and a driven shaft, including a pair of plates fixed on said driven shaft for rotation therewith, a disc of resilient material intermediate said plates having a resiliently flexible connection with said driving shaft for rotation as a unit therewith and laterally engageable by said plates in response to centrifugal forces generated by the rotation of said driving shaft, said resiliently flexible connection comprising a drum rotatable as a unit with the driving shaft and extensions of said disc in operative contact with said drum.

2. A coupling between a driving shaft and a driven shaft aligned therewith, including a drum rotatable as a unit with said driving shaft, a pair of plates fixed on said driven shaft for rotation therewith, a disc of resilient material intermediate said plates, a frame encompassing said disc peripherally, resiliently flexible lugs between said frame and said drum, means on said drum for receiving said lugs, said disc being laterally engageable by said plates in response to centrifugal forces generated by the rotation of said driving shaft, and the resilience of said lugs acting to permit said disc to adjust itself to any misalignment of said shafts.

3. A coupling between a driving shaft and a driven shaft aligned therewith, including a drum rotatable as a unit with said driving shaft, a pair of plates fixed on said driven shaft for rotation therewith, a disc of resilient material intermediate said plates, a frame peripherally encompassing said disc except at certain intervals provided with openings, extensions of said disc passing through said openings, means on said drum for receiving said extensions, said disc being laterally engageable by said plates in response to centrifugal forces generated by the rotation of said driving shaft, and the resilience of said extensions acting to permit said disc to adjust itself to any misalignment of said shafts.

ALBERT D. PENTZ.

REFERENCES CITED

The following references are of record in the file of this patent:

UNITED STATES PATENTS

| Number | Name | Date |
|---|---|---|
| 1,683,954 | Carrey | Sept. 11, 1928 |
| 1,710,174 | Manvillier | Apr. 23, 1929 |
| 1,814,566 | Lombard | July 14, 1931 |
| 1,855,643 | Matthews | Apr. 26, 1932 |
| 2,209,774 | Huebsch | July 30, 1940 |
| 2,340,415 | Eason | Feb. 1, 1944 |
| 2,350,810 | Pentz | June 6, 1944 |
| 2,427,620 | Pentz | Sept. 16, 1947 |